(12) United States Patent
Raith

(10) Patent No.: US 6,510,515 B1
(45) Date of Patent: Jan. 21, 2003

(54) BROADCAST SERVICE ACCESS CONTROL

(75) Inventor: Alex Krister Raith, Durham, NC (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/132,232

(22) Filed: Aug. 11, 1998

Related U.S. Application Data

(60) Provisional application No. 60/092,592, filed on Jul. 10, 1998, and provisional application No. 60/089,280, filed on Jun. 15, 1998.

(51) Int. Cl.$^7$ ................................................. G06F 1/24
(52) U.S. Cl. .................... 713/163; 713/168; 713/170; 380/210; 380/239; 380/255
(58) Field of Search ................. 380/210, 212, 380/239, 255, 258, 42, 278; 713/168, 170, 163

(56) References Cited

U.S. PATENT DOCUMENTS

| | | | |
|---|---|---|---|
| 5,117,458 A | 5/1992 | Takaragi et al. ............... 380/4 |
| 5,159,634 A | * 10/1992 | Reeds, III ..................... 380/42 |
| 5,553,140 A | * 9/1996 | Kubota et al. ................. 380/10 |
| 5,708,960 A | 1/1998 | Kamisaka et al. ............ 455/3.2 |
| 6,105,134 A | * 8/2000 | Pinder et al. ................ 713/710 |

FOREIGN PATENT DOCUMENTS

| | | | |
|---|---|---|---|
| EP | 132401 | 1/1985 | ............ H04N/7/16 |
| EP | 0915580 A | 5/1999 | ............ H04H/1/00 |

OTHER PUBLICATIONS

European Search Report re RS 101623 Date of mailing of search: Jan. 13, 1999.

* cited by examiner

*Primary Examiner*—Thomas R. Peeso

(57) ABSTRACT

Techniques and systems for controlling access to information broadcast over point-to-multipoint resources in radiocommunication systems are described. These techniques can be used to provide controllable access to broadcast information services, e.g., security quote services, sports information services, etc., which broadcast services can be provided in conjunction with more conventional cellular radiocommunication services, e.g., voice calls. Exemplary embodiments of the present invention enable subscribing users' equipment to output broadcast information using, for example, either a status variable within the remote equipment or encryption for which subscribing devices have a corresponding decryption key.

88 Claims, 4 Drawing Sheets

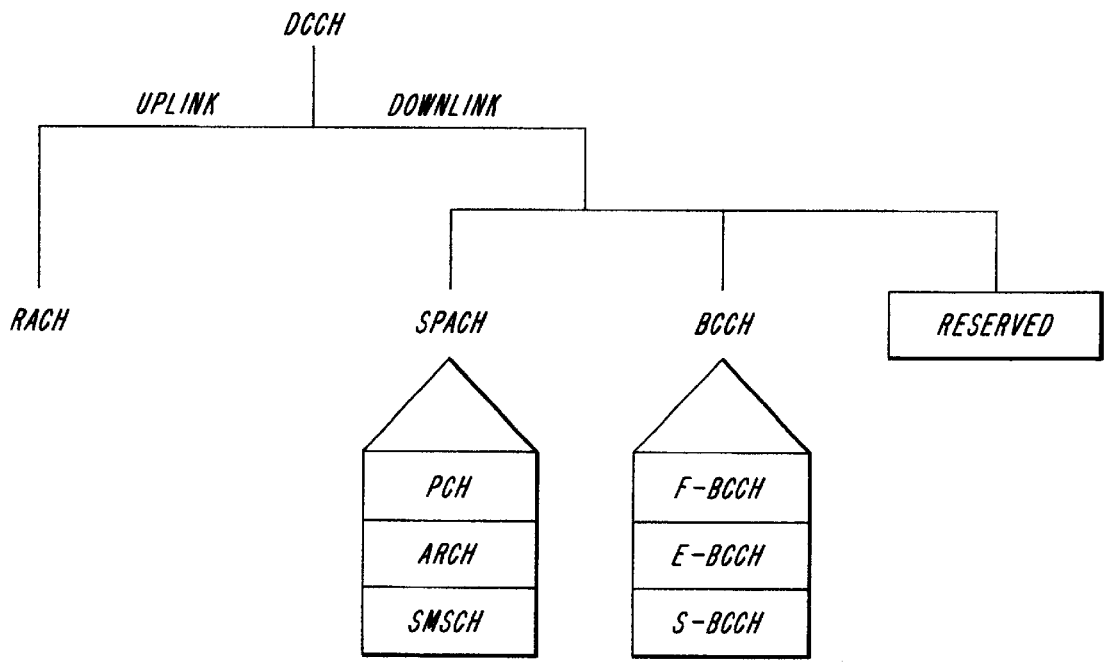

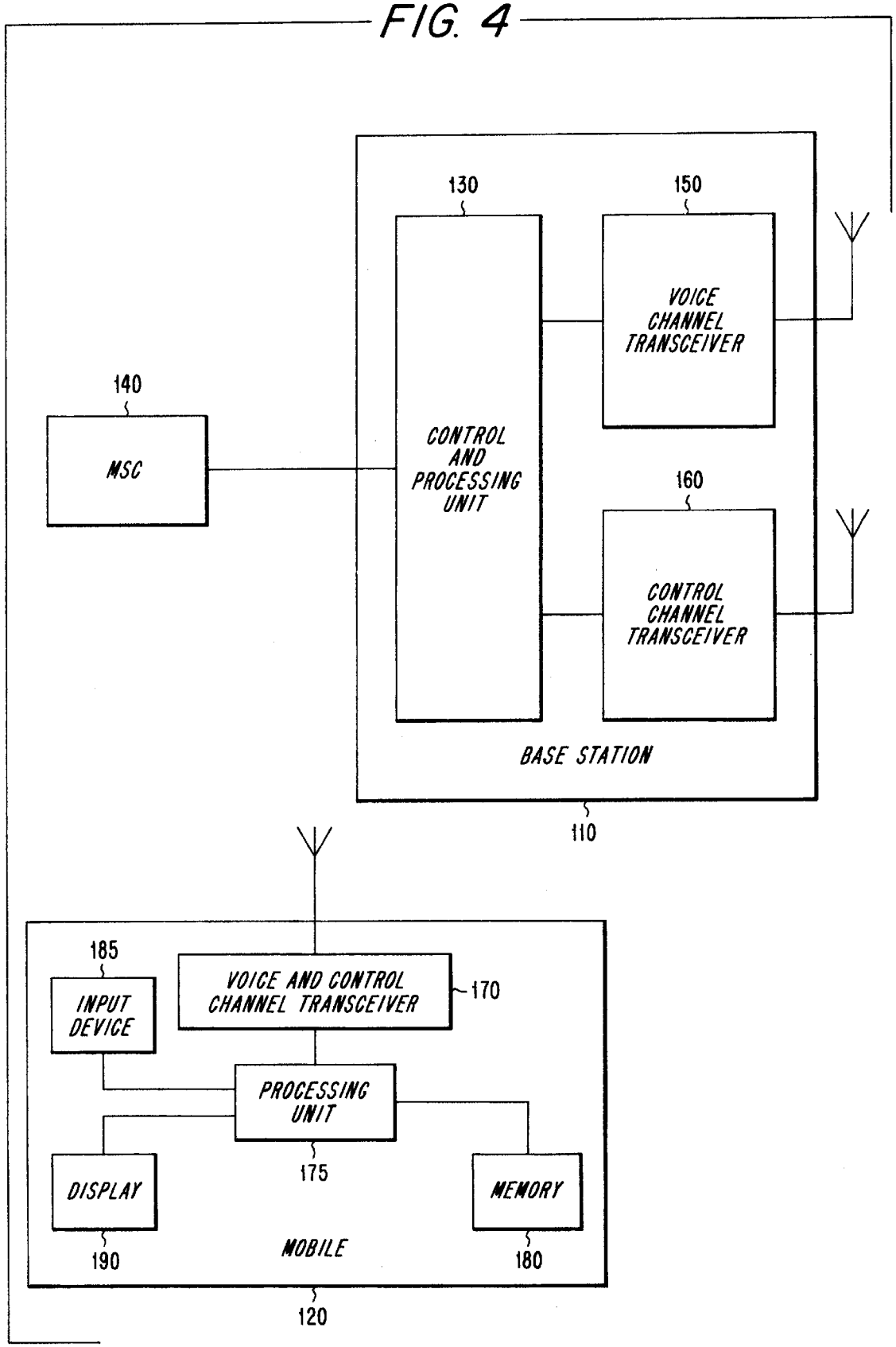

BROADCAST SERVICE ACCESS CONTROL

PRIORITY AND RELATED APPLICATIONS

This application claims priority under 35 U.S.C. §§119 and/or 365 to U.S. Provisional Application No. 60/092,592 filed in the U.S. on Jul. 10, 1998 ; and to U.S. Provisional Application No. 60/089,280 filed in the U.S. on Jun. 15, 1998; the entire content of both applications are hereby incorporated by reference.

BACKGROUND

The present invention relates generally to the provision of information services in radiocommunication systems and, more particularly, to techniques for controlling access to broadcast information services provided in conjunction with existing radiocommunication services and systems.

The growth of commercial radiocommunications has been dramatic over the last fifteen years. Pagers and cellular phones, in particular, stand out as relatively common equipment in many urban settings. These two different types of communication devices, and supporting systems, have evolved from different fundamental purposes, i.e., pagers for traditionally providing one-way, limited information to one or more end users and cellular phones for traditionally providing two-way voice communication service.

As time and technology progress, the traditional functional dividing lines between these two different types of radiocommunication devices have blurred. Pagers have acquired some of the functionality that was traditionally provided by cellular phones and vice-versa. For example, two-way pagers have been developed which permit the pager to transmit messages to the paging system, which messages can then be forwarded to other parties. Similarly, cellular phones have acquired the capability to transmit and receive short (e.g., on the order of 160 alphanumeric character) text messages which can be output on the display of a cellular phone. This evolution in radiocommunication devices has led to the development and marketing of a host of new information services.

As broadcast information services are developed for application to conventional cellular systems, Applicant anticipates that it will be desirable to implement techniques that permit network operators and/or service providers to control access to these new services. Historically, access control/security for wireless services varies between four general types of wireless services: (1) point-to-point services, e.g., voice connections between two remote terminals, (2) group calls, e.g., voice connections between more than two remote terminals (3) non-end user point-to-multipoint services, e.g., system control broadcast information and (4) end-user point-to-multipoint services, e.g., stock quote services, sport score services, etc.

Point-to-point services consist, as of today, mostly of speech calls made to the fixed telephone network or to other mobile users. In order to reduce fraud and limit eavesdropping, authentication and encryption are now supported in all digital cellular systems, including the satellite systems designed for personal communication which will soon be in operation. Each mobile phone (or SIM card in mobile phones operating in accordance with the GSM standard) has a secret key. This key is the root for both authentication and encryption and each user's secret key is unique. This key, referred to as the A-key in security specifications promulgated by the Telecommunications Industry Association (TIA), can be entered by the user through a keyboard or be sent or generated in the process of the Over-the-Air Activation Teleservice (OATS) process as described in the TIA specifications. In GSM, the key resides in the "smart card" (SIM card) and can not be changed. The authentication allows the system to verify the user (or more specifically the phone or SIM card). Encryption of transmissions further limits illegitimate use of the system, e.g. sending false information to the mobile station. Bilateral authentication, where the base station must also verify its legitimacy, reduces the risk of having an illegitimate base station sending dummy data to the mobile.

Similar to point-to-point communication services are group calls. If the group call is set up by having each member assigned to an individual traffic channel, as for a more "normal" call between two individuals, the individual A-key based authentication and encryption can be used and there is no difference between group calls and standard voice calls that would require further protective procedures. If there is a common channel assigned for the group, which is feasible in particular in the downlink, all users must be able to listen to this channel. Hence, the encryption of the downlink can in this case not be based on a particular user's A-key. A common encryption key for the group (G-key) must instead be used for the encryption. Each user can still be authenticated on an individual basis, e.g. using the standard A-key. However, the encryption key must not be a root key to anyone's A-key. The G-key may be entered into the mobile station by the key-pad or sent to the mobile station under protection of the normal A-key based encryption.

For non end user, point-to-multipoint services, e.g., the information provided on a broadcast control channel (BCCH) in a cellular system, there are no protection mechanisms in place in current wireless systems. This is the case because system designers want to make it fast and easy for mobile stations to find and read the control information found on this type of resource. For this service type there is little or no incentive to bar non-subscribing users from reading the control information being broadcast on the BCCH, however techniques for validating the integrity of the data may be provided. Thus, encryption to bar access of point-to-multipoint control channels is not needed or provided.

End user, point-to-multipoint services, e.g., the stock quote and headline services described in the two above-incorporated utility patent applications, differ from non end user, point-to-multipoint services in that the service operator, which may not necessarily be the same as the cellular operator, do not want non-subscribing individuals to be able to read the information broadcast to subscribers over the air interface. For example, if stock quotes are provided in a broadcast channel, users who do not pay a monthly subscription fee should not be able to obtain access to the information. As with the broadcast control information, data integrity protection may also be desirable for data services broadcast to subscribing end users.

Thus, it can be seen that it would be desirable to provide methods and systems for controlling access to broadcast information services which provides suitable information integrity and a level of access control, wherein such concerns are balanced against ease of operation (e.g., ease of subscriber activation/deactivation).

SUMMARY

Exemplary embodiments of the present invention provide techniques which support access control to broadcast information services provided via radiocommunication systems.

Service access control techniques according to the present invention attempt to achieve a number of objectives. Specifically, only eligible users should be able to receive services, it shall be simple and fast to enable a service for a particular user, it shall be simple and fast to disable a service for a particular user, it should be difficult to insert false messages into the broadcast channel or sub-channel, it should be possible for the operator to verify a user's claim that he or she is not able to access a service and therefore is challenging the bill. The end user's equipment, e.g., mobile station, may be a receive-only device, similar to a simple pager, or may be a receive/transmit device, such as a mobile phone.

According to a purely illustrative, exemplary embodiment of the present invention, the broadcast information service can be a security quote service which is provided in an IS-136 compliant system having broadcast short-message-service (SMS) capability. The portion of the broadcast control channel which has been reserved in IS-136 for SMS can be further separated into a plurality of logical sub-channels for carrying various portions of the data used to implement the security quote service. More specifically, these exemplary sub-channels can include a Security Name channel, a Start Value channel and a Delta channel.

Access to these channels can be provided using different techniques. According to a first exemplary embodiment, a status variable can be maintained in the remote device which informs the remote device whether the user is authorized to have information associated with a particular broadcast service. The remote device checks this status variable and selectively outputs information in accordance therewith. A service provider can periodically send enable/disable signals to update this status variable.

According to another exemplary embodiment of the invention, information transmitted on broadcast channels can be encrypted. Then, subscribers will periodically receive keys usable to decrypt the broadcast information.

BRIEF DESCRIPTION OF THE DRAWINGS

The above objects and features of the present invention will be more apparent from the following description of the preferred embodiments with reference to the accompanying drawings, wherein:

FIG. 1 illustrates a hyperframe structure according which can be used to implement the present invention;

FIG. 2 illustrates the logical channels of the DCCH which can be used to implement the present invention;

FIG. 4 illustrates an exemplary radiotelephone system into which the present invention may be implemented;

DETAILED DESCRIPTION

Figure 3:
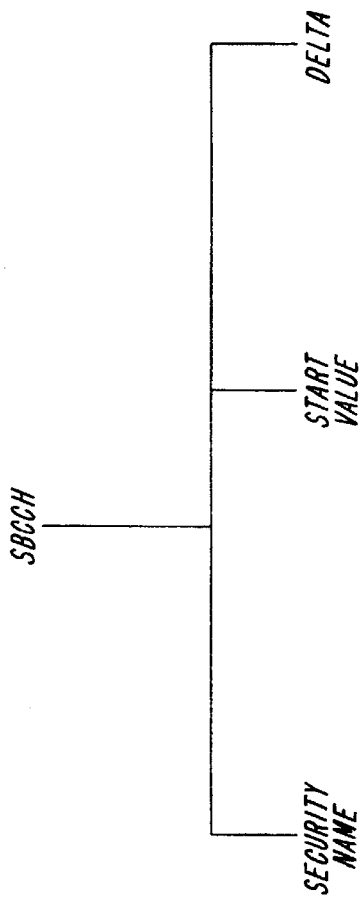
FIG. 3 illustrates exemplary subdivisions of logical channels used to broadcast information associated with a security quote service according to the present invention.

The following description is written in terms of a cellular radiotelephone system, but it will be understood that Applicant's invention is not limited to that environment. Also, the following description is written in the context of IS-136 compliant, TDMA cellular communication systems, but (as mentioned above) it will be understood by those skilled in the art that the present invention may be implemented in other digital communication applications including those which are designed in accordance with other standards, e.g., GSM or PDC, and those which use CDMA as an access methodology, e.g., IS-95.

In particular, exemplary embodiments of the present invention describe techniques and systems for providing broadcast information services whose access are controlled by the service operator. To provide some context within which to discuss access control techniques, an exemplary broadcast service is first described, which service is provided by an operator using the broadcast resources available in IS-136, in particular the broadcast SMS channel (S-BCCH). Some of the details associated with IS-136 systems generally and the broadcast SMS channel specifically are described below, while others are omitted to avoid obscuring the present invention. However, the interested reader is referred to U.S. Pat. No. 5,603,081 to Raith et al. and U.S. patent application Ser. No. 08/482,754 also to Raith et al. for additional information pertaining to IS-136 related systems generally and broadcast SMS techniques specifically, respectively. The disclosures of both the aforementioned U.S. patent and U.S. patent application are expressly incorporated here by reference.

In exemplary embodiments of Applicant's invention, the transmission of information from base stations to mobile stations is structured into successions of different kinds of logical frames. FIG. 1 illustrates the frame structure of a forward (base station to mobile station) DCCH according to IS-136 and shows two successive hyperframes (HF), each of which preferably comprises a respective primary superframe (SF) and a respective secondary superframe. It will be recognized, of course, that a hyperframe could include more than two superframes.

Three successive superframes are illustrated in FIG. 1, each comprising a plurality of time slots that are organized as logical channels F-BCCH, E-BCCH, S-BCCH, and SPACH that are described in more detail below. At this point, it is sufficient to note that each superframe in a forward DCCH includes a complete set of F-BCCH information (i.e., a set of Layer 3 messages), using as many slots as are necessary, and that each superframe begins with a F-BCCH slot. After the F-BCCH slot or slots, the remaining slots in each superframe include one or more (or no) slots for the E-BCCH, S-BCCH, and SPACH logical channels.

Referring to FIG. 1, and more particularly to FIG. 2, each superframe of the downlink (forward) DCCH preferably comprises a broadcast control channel BCCH, and a short-message-service/paging/access channel SPACH. The BCCH comprises a fast BCCH (the F-BCCH shown in FIG. 1); an extended BCCH (the E-BCCH); and a short-message-service BCCH (the S-BCCH), some of which are used, in general, to carry generic, system-related information from the base stations to the mobiles.

The F-BCCH logical channel carries time-critical system information, such as the structure of the DCCH, other parameters that are essential for accessing the system, and an E-BCCH change flag which is described in more detail in U.S. patent application Ser. No. 08/482,754, which is commonly assigned and incorporated herein by reference; as noted above, a complete set of F-BCCH information is sent in every superframe. The E-BCCH logical channel carries system information that is less time-critical than the information sent on the F-BCCH; a complete set of E-BCCH information (i.e., a set of Layer 3 messages) may span several superframes and need not be aligned to start in the first E-BCCH slot of a superframe. The S-BCCH logical channel carries short broadcast messages, such as stock information, advertisements and other information of interest to various classes of mobile subscriber. According to exemplary embodiments of the present invention, this logical channel may be used to support point-to-multipoint information services, for example a security quote service, by dividing the S-BCCH channel into at least three logical sub-channels which support this broadcast information service: a Security Name channel, a Start Value channel and a Delta channel as seen in FIG. 3, wherein various portions of the information needed to output stock quote information at the remote devices of subscribing users are transmitted on each of the three sub-channels. For more details regarding how these three S-BCCH subchannels are used to provide an exemplary broadcast information service, the interested reader is referred to the above-incorporated "Channelization and Encoding Techniques for Information Services Transmitted Via Radiocommunication Systems" patent application.

The foregoing provides a brief overview of portions of an air interface which can be adapted to provide a broadcast (i.e., point-to-multipoint) information service to subscribing users by transmissions of radio signals thereon. Of course, the subscribing user will also need network equipment to make these transmissions and terminal equipment with which to receive this information. Such equipment can, for example, include conventional cellular equipment. For example, FIG. 4 is a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCHs and DTCs that share the same radio carrier frequency.

The user may receive information from the broadcast service to which he or she describes using a conventional mobile station 120. The mobile station 120 receives the information broadcast on a control channel at its voice and control channel transceiver 170. Then, the processing unit 175 evaluates the received control channel information, which includes the characteristics of cells that are candidates for the mobile station to lock on to, and determines on which cell the mobile should lock.

The mobile station 120 also includes memory 180 as well as an input device 185, such as a numeric keypad, which allows a user to interact with the mobile station. A display device 190, such as an LCD screen, provides a visual display of information to the user.

While the present invention is certainly applicable to conventional remote terminals like mobile station 120, it is also applicable to other types of remote receiving devices. For example, while the present invention is applicable to systems wherein the remote devices have both receive and transmit capabilities, it is also applicable to systems which have receive- only devices, e.g., like traditional paging remote devices. In fact, there may be substantial incentive to provide at least some receive-only remote devices when considering that (1) reception of the type of information for which broadcast services are envisioned, e.g., sports scores, stock quotes, etc., does not per se require transmit capability in a remote device and (2) remote devices can be made smaller and less costly by excluding transmit capability.

In any event, knowledge of the remote device capabilities (or lack thereof) to be supported may be useful in determining which type of Broadcast Service Access Control (B-SAC) scheme to implement. For example, in some of the following exemplary B-SAC embodiments it may be desirable for a subscriber to acknowledge receipt of access control information, e.g., an encryption key, thus requiring transmit capability.

In addition to transmit capability, the I/O interfaces associated with remote devices may also differ significantly. For example, a remote device intended to operate in conjunction with a broadcast stock quote service may not need an elaborate keyboard. Thus, the dialpad as found on a regular voice phone may not be supported and the remote device may have no means to enter general data into the device. Instead, only a few "soft-keys" may be required for the user to scroll and select folders.

Accordingly, remote devices which may be used in conjunction with broadcast information services can be generally categorized in the following table in terms of presence or absence of transmit (TX) capability and local data entry (LDE) capability. Where appropriate, comments are provided regarding the category of remote device which is supported by (or preferably used in conjunction with) a particular B-SAC embodiment.

| | Device capabilities | |
| --- | --- | --- |
| | TX capabilities | No TX capabilities |
| LDE | type A1 | type B1 |
| No LDE | type A2 | type B2 |

For example, teleservices involving data (as opposed to voice) transfer between the network and the remote device typically requires an acknowledgement signal in return from the remote device and, sometimes, a further acknowledgement to a dedicated teleservice server. Thus, for type B devices, basing B-SAC on a teleservice-like implementation, where the access control requires some reaction from the remote device, is not feasible. Even if traditional teleservice protocols are relaxed to permit operation without acknowledge signals, the system will still have to handle the issue of ensuring that the remote device actually receives the access control information that has been forwarded to it, e.g., by repeatedly retransmitting this information. This problem is further heightened by the fact that type B devices cannot perform conventional registration processes, i.e., it is more difficult for the system to know the location of the remote device and, therefore, the system would likely need to transmit the information at a greater number of different transmitting stations than if the general position of the remote device were known.

Given these general considerations of different remote device types, some or all of which may be used to receive broadcast user information, e.g., stock quote information over S-BCCH sub-channels, several exemplary B-SAC embodiments will now be described. According to a first exemplary B-SAC embodiment, which provides a relatively low level of access control, but is applicable to both A and B type remote devices, access control is provided by way of a status variable monitored by the remote device.

More specifically, the remote device maintains a status variable associated with each broadcast service, which variable is enabled or disabled depending upon whether the remote device has subscribed to the associated broadcast service. If the status variable is enabled, then the remote device will display or otherwise output information associated with this broadcast service, i.e., stock quotes. If the status variable is disabled, then the remote device will not output information associated with this service, even though the remote device may be capable of reading the information, i.e., the information can be unencrypted in this exemplary embodiment.

The status variable can be maintained in the memory 180 of the remote device. Memory 180 may comprise a register or registers using portions of a non-volatile memory or may comprise a removable smart card associated with the remote device. In either case, the status variable can be enabled and disabled by receipt of special messages transmitted over the air interface. Unlike the broadcast service itself, the special enable/disable message is addressed, i.e., it is device specific, so that individual remote devices can be readily enabled or disabled. According to this exemplary embodiment, remote devices can be manufactured or sold in a mode wherein one or more status variables are preset to "enabled" for a period of time, e.g., one month, to allow the new remote device user a free trial period for certain services.

The enabled state of the status variable may remain enabled only for a predetermined time period after receipt of an enabling message. For example, each receipt of a status variable enable signal can reset a stored date to be the date of receipt of the enable signal. This date can be compared with a current date, e.g., as received on the control channel or tracked by the remote device's internal clock. As long as the current date is within some predetermined time period ($t_{old}$) of receipt of the enable message, the enabled state is maintained and the remote device will output information broadcast in conjunction with this service. Thus, these enable messages can be considered to be like "heartbeats" in the sense that they breathe life into the subscriber's ability to continue to receive information from the broadcast service.

When a subscriber terminates his or her subscription, the system can send disable signals addressed to the subscriber's remote device. This will reset the status variable to a disabled value, by virtue of which the remote device will not output data associated with this service. Of course, if a subscriber becomes aware of the fact that the status variable is changed from enabled to disabled by reception of the disable signal, he or she may decide to try to thwart this process by powering down his or her equipment during periods when a disable signal is expected to be sent by the system, e.g., after the subscription is ended. The effectiveness of this type of activity can be reduced by employing a validation period in conjunction with the enable signal. This exemplary usage of a status variable in a B-SAC technique according to the present invention may be more readily understood by referring to the following example in conjunction with FIG. 5.

Figure 5:
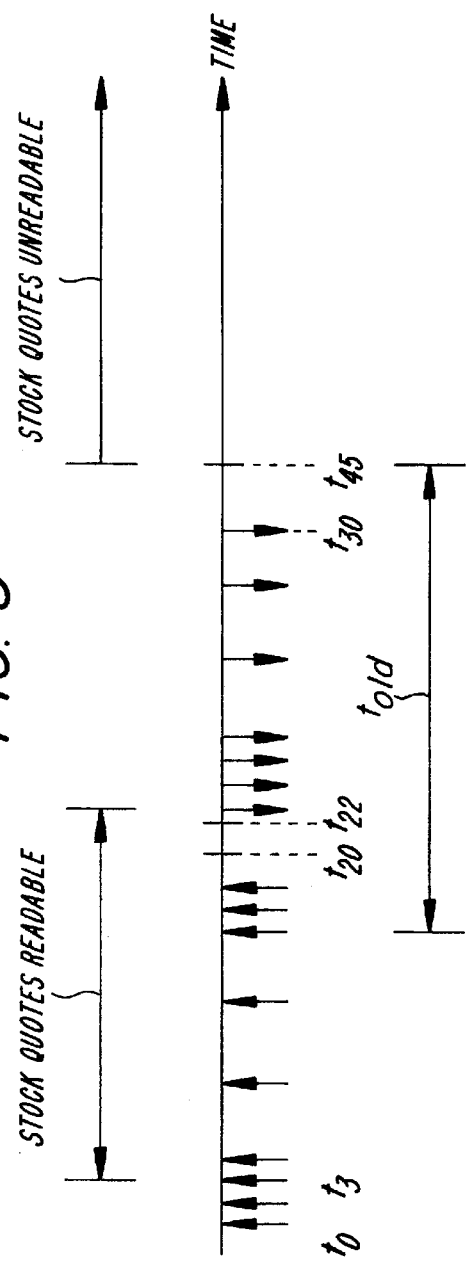
FIG. 5 depicts a signalling time line used to describe an exemplary status variable embodiment of the present invention.

Therein, a subscription is activated at time to and the service server begins to periodically transmit enable messages, as represented in FIG. 5 by the arrows pointing toward the time line. Initially, the frequency with which these enable messages are transmitted may be relatively high. Although the subscription was activated by the service operator at time $t_0$, for various reasons such as channel errors or the remote devicet being powered down, the remote device does not receive its first enable message until time $t_3$. Thus, the remote device can then store the date/time of receipt of the enable message in an associated status variable register and begin to read the information associated with the service that has been enabled, e.g., stock quote information on the S-BCCH subchannels illustrated in FIG. 3. During the period of time that the subscription is active, the service server will periodically send enable signals to reset the date/time of receipt stored in the status variable register against which the current date plus the validation period can be compared, as described below.

At some time in the future $t_{22}$, the subscription is terminated. At that time, or some time shortly thereafter, the service server will begin to send disable messages as represented by the arrows pointing away from the timeline. As soon as the remote device receives one of these messages, it resets its stored status variable indicator to disabled so that it will no longer output information associated with this service. At some point in time, the service server will stop sending disable messages directed to this particular remote station, assuming that at least one has been received, in order to conserve bandwidth utilization.

However, assume that the user powers down his or her remote device at time $t_{20}$, i.e., before the subscription ends at time $t_{22}$ and before a disable message can be received. Absent some other access control mechanism, the user may not receive a disable signal, assuming that the system eventually stops sending disable signals addressed to that particular remote device. Thus, after the last disable signal is transmitted by the service server, e.g., time $t_{30}$ in FIG. 5, the user could theoretically power on his or her and again be able to read the broadcast information since the status variable in his or her device would still be enabled. This potential shortcoming of this exemplary embodiment is addressed by the provision of the validity period $t_{old}$.

According to exemplary embodiments, the status variable will only retain its enabled state with respect to this service until it receives a disable message or until the date/time of its last received enable signal plus $t_{old}$ exceeds the current date/time. As seen in FIG. 5, $t_{old}$ therefore begins when the subscriber's equipment receives its last enable signal (which may not be the last enable signal transmitted by the system, as illustrated by the subsequent two "up" arrows in FIG. 5 after $t_{old}$ begins). Once $t_{old}$ ends at time $t_{45}$, the status variable is reset to disabled since no further enable signals were received. At this time, the stock quote information will not be output to the user.

The parameter $t_{old}$ may be prestored in the remote device. Alternatively, it may be transmitted to the remote device over the air interface and may be changeable. If changeable, $t_{old}$ should be permitted to be no greater than some maximum time $t_{max}$ to avoid fraud.

To assess the bandwidth utilization associated with broadcast service access according to this exemplary embodiment consider the following example. Assume 1 million users, with the service adding 50,000 new users every month and terminating 50,000 subscriptions every month. Thus, there would be 1 million users who need to receive an enable message with $t_{old}$. Assume $t_{old}$ is one month. and that five enable messages need to be sent to each user within this time period for redundancy purposes. This requires 5 million messages per month=166000 messages per day=7600 messages per hour=2 messages per second. For the exemplary IS-136 compliant system described above and assuming about 100 bits payload available per S-BCCH slot (every 0.64 second), an address length of 32 bits to identify each subscriber's equipment and 1 bit for the enable/disable flag, this results in 3 enable messages per slot or about 4.7 messages per second. Thus, the enable/disable message requires approximately the capacity of one half of a S-BCCH slot. During off-peak hours, one or more S-BCCH slots can be assigned for this purpose and, correspondingly, none during peak hours. If there are multiple services with multiple associated status variables, only one additional bit per service needs to be transmitted. However, a service identifier may have to be transmitted also if a fixed mapping position in the message is not used, which service identifier may provide a more flexible protocol. The format for the message could then be: address, SV1, SV2, SV3 using a fixed mapping of bit position and service number or: address, SI1, SV1, SI2, SV2, . . . where SI is the service identifier.

In addition to being bandwidth feasible, Applicant envisions this status variable B-SAC embodiment to also be commercially viable given the industry practices today. Considering that most users are not sufficiently technically proficient to tamper with a remote device's programming, e.g., to manually reset the status variable, it seems unlikely that this type of fraud would commercially impact the service provider's. Moreover, given the size of the companies that manufacture these remote devices, the subsidization of prices associated with remote devices as an incentive to sell services and the distribution channels for these devices, it seems unlikely that "black" market devices having permanently enabled status variables would be sufficiently valuable to pose problems.

Although the status variable B-SAC embodiment provides a beneficial balance between ease-of-use and access control, some service providers/system operators may desire additional access control and some level of data integrity to be accorded these types of broadcast services. Therefore, according to another exemplary embodiment of the present invention, the information broadcast by a service provider may be encrypted. Remote devices can download a decryption (service) key which can change, e.g., on a monthly basis. A special teleservice can be developed for the downloading or it can be an additional element in the Over-the-air Activation TeleService (OATS) set forth in EIA/TIA IS-136. Along with the decryption key, a validity time can be included. Alternatively, a key index is provided. In the broadcast information service channel itself (e.g. stock quote) or in a general place on the BCCH, the current key-index or validity time is provided. This allows the remote device to determine that the service key it has is valid. This is important when e.g. the device has been powered off for a long time. If the key index or the validity time does not match the stored data in the device, the user is alerted.

Note that the term service key as used herein does not necessarily imply strong algorithmic encryption techniques. In its simplest form the service key could be a "PIN number" or, in this context, a Service Identification Number (SIN). This is not the same as the Service Identifier which identifies a particular service from a palette of services. If there is no provision to enter the service key through some means easy for a typical user, the service key and key index can be merged i.e. the SIN can be sent in clear form on the BCCH. However, a validity period should preferably be provided. Although a hacker can easily read the SIN, there is no simple way of entering it into the device for ordinary users.

In order to avoid interrupted service when the service key is changed, the system may issue the subsequent service key in advance e.g. a week in advance. Thus, the remote device will store both the current service key and the subsequent service key. The mobile will automatically change service keys according to information found on the BCCH. If key index is used, the mobile will first check the index before attempting to read the service content. If validity time in form of a date is used, the mobile can look for a date from the BCCH or if not present, from an internal clock. If the user enables a broadcast service and the device determines that the service key is not valid or that the status variable is disabled (if no encryption as described above), the user is informed with an indication on the display and/or an audible alert.

A simpler form of protecting the data broadcast by the service provider is to use a simple form of scrambling instead of encryption. Although scrambling may not bar hackers from reading the information, most potential subscribers will not attempt to access the scrambled data. The benefit achieved with scrambling versus encryption is that the computational complexity is reduced. For example, the data or part of the data may be altered by a semi secret variable e.g. the key itself. A cyclic redundancy check (CRC) on the service layer may be altered (e.g. EXOR'd with the key) or the calculation of the CRC may include the key in addition to the data. A lower layer CRC should not be used for this purpose since the remote device can then not distinguish channel errors from service barring.

Figure 6:
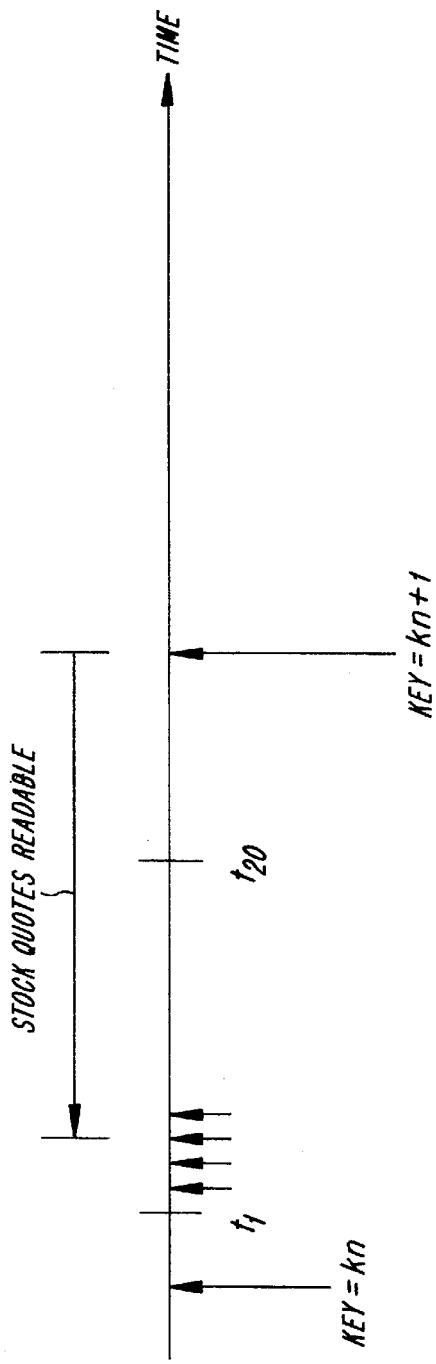
FIGS. 6 and 7 depict signalling time lines used to describe an exemplary encryption (scrambling) embodiment of the present invention.

FIG. 6 illustrates signalling associated with a B-SAC based on scrambling (or encryption) according to this exemplary embodiment. The first event (identified by the leftmost arrow pointing upward toward the timeline) is that the system sets the key to kn. At time $t_1$, while kn is still valid, the user requests the broadcast service. The service server sends, through the wireless system, the service key a certain number of times, e.g., which procedure is particularly desirable when type B remote devices are being supported by the system. In this example, the third instance of the message containing service key kn (as indicated by the smaller arrows pointing toward the timeline subsequent to time $t_1$) is correctly received by the remote device. This begins the period of time during which the remote device can read stock quotes from the broadcast service. At a later point in time $t_{20}$, while kn is still valid, the user requests termination of the service. The system need not do anything, but instead may permit the user to use the service until the service key expires. At some predetermined time, the system changes the key to kn+1. The user can no longer decrypt the data and the service can not be presented to the user since the broadcast information is now transmitted in an encrypted form using a key which is unknown to this remote device. Those skilled in the art will appreciate that it is possible to combine the disable signal from the embodiment described above with respect to FIG. 5 with this encryption (scrambling) embodiment and have the system send a disable signal to the device with the assumption that the devices are designed to honor the request to be disabled.

Figure 7:
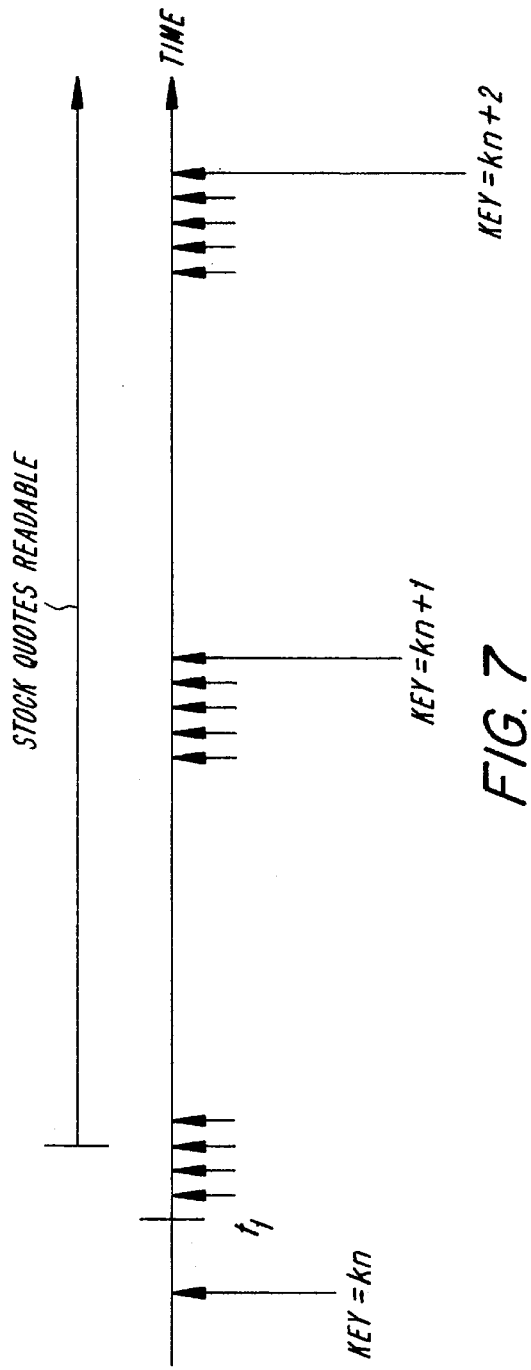

In FIG. 7 another example wherein the B-SAC is performed by scrambling (or encryption) is depicted. The difference between the example of FIG. 6 and that of FIG. 7, is that the user does not request to terminate the service in the example of FIG. 7. In this case the system sends the new service key kn+1, preferably before the new key becomes valid. A number of transmission instances are provided used in order to maximize the likelihood of having the device receiving at least one of them. Since the key has an index or validity time, the remote device would know that these are just repetitions if it receives more than one. When the kn+1 validity time ends, the system repeats the procedure and sends service key=kn+2 a number of times. This continues until the user wants to terminate the subscription and the procedure defined in FIG. 6 then becomes applicable.

In both of the foregoing exemplary embodiments, i.e., status variable and encryption(scrambling), the system must send either an enable/disable message or a service key to the remote device. The sending of the status variable message or service key can be performed on a point-to-point channel, or on the broadcast channel. Although the embodiments of FIGS. 5–7 are described in the context of non-acknowledged status variable or encryption (scrambling) B-SAC embodiments, note that other than the "shotgun" approach of sending multiple messages to the remote devices, the other aspects of these figures are equally applicable to B-SAC embodiments according to the present invention wherein the status variable messages or encryption key messages are acknowledged by the remote devices.

For the B-SAC embodiments employing encryption, the service key can be sent on the broadcast channel itself. Preferably, transmission of the service key should also be encrypted, since otherwise the information contents of the service itself may as well be unencrypted if a remote device can read the service key. Note that the service key is the same for all users since the service is a point-to-multipoint service. By encrypting transmission of the service key, fraudulent users can then not read the service key and use it in their devices to read information from a broadcast service.

On the broadcast channel, the service key can then be delivered as an addressed message (i.e. the device address is present in the message), encrypted with a personal (unique) key associated with the remote device. For type A devices, conventional cellular encryption techniques can be applied when sending the service key, e.g., sent in an OATS message, or in a special purpose message, encrypted as any other voice or message transaction (e.g., based on the A-key for the TIA standards). However, it is also possible to perform the encryption of the service key using a special (for this purpose) key, referred to herein as the B-key. For a type B device, which does not reveal any information by way of its transmissions, the ESN or similar equipment identifier can be used as the B-key. For Type A and B devices, the B-key may be loaded at manufacturing or entered through the keypad if the remote device has this capability. For type A devices, the OATS procedure, or some similar technique, can be used to download the B-key. For type A devices, the standard MIN/IMSI identifiers can be used for the address of the B-key message. For type B devices, the address can be an equipment identifier (ESN) or an assigned MIN/IMSI. For both A and B type remote devices, a dedicated identifier, termed here a Broadcast Identifier Number (BIN) can be assigned to the device and used for the address. However, the ESN should not be used for both BIN and B-key, since otherwise the decryption key is transmitted in the clear and the purpose for the encryption is lost. In order to save channel capacity in exemplary B-SAC embodiments wherein acknowledged teleservice mechanisms are not used to deliver the service key, the service key for the next period of subscription can be sent when there is less broadcast service data to send, typically nights and early mornings. Thus the user should have the device turned on during off-peak hours to change the service key. While leaving the remote device on during off hours may be undesirable, the increased access control and data integrity associated with encryption may be seen to offset this drawback.

For example, these encryption (scrambling) B-SAC embodiments provide mechanisms to bar ineligible users from accessing broadcast information even if they have the capability to manipulate registers and signals within their remote devices. Even if a user can retrieve the service key from one device, the knowledge necessary to enter the service key into multiple devices in a manner which would allow others non-subscribers to read the broadcast information is highly specialized and not easily provided to the public.

If the broadcast service is disabled, e.g., by the lack of proper decryption key or by having the status variable set to disabled, the user may be informed that by dialling a special number, the service can be activated. For example, the service provider may issue the following activation information, which could be sent along the billing statement:

| Service | monthly fee | activate | deactivate |
| --- | --- | --- | --- |
| 1. Stock quotes (all stocks found in USA Today) | $19.95 | *92*23*1 | *92*45*1 |
| 2. Currency | $0.95 | *92*23*2 | *92*45*2 |
| 3. Options | $4.95 | *92*23*3 | *92*45*3 |
| 4. mutual funds (all funds found in USA Today) | $9.95 | *92*23*4 | *92*45*4 |
| 5. Sports scores (all major leagues, 30 minutes delayed) | $4.95 | *92*23*5 | *92*45*5 |

This table uses, purely as an example, the digit pair 23 as a code for broadcast service activation, 45 as a code for deactivation, and the last digit indicates the broadcast service number.

For type A remote devices, the user may be forwarded to an automatic voice prompt system and requested to confirm a choice by pressing a specified key pad entry. The B-SAC teleservice, containing the service key and other attributes described below, is then downloaded. These attributes may include a text message displayed to the user saying that the service is now enabled. Alternatively, a regular SMS message may be sent along the B-SAC teleservice to indicate the successful activation. The user may be prompted for the time of subscription. If the user selects more than a single minimum time period, multiple service keys and associated attributes can be downloaded.

Since there are multiple services that can be subscribed to on an individual basis, each service has its own key or its own service status variable. When an activation signal is sent, the following attributes may be included: service identifier, key, key index, validity period, text describing changes to the service (planned or recent changes) e.g. additions of new types of securities, greeting text, telephone number if problem receiving the service, . . . etc.

The system may request to retrieve the key in order to verify the contents of the mobile. In order to avoid false base stations polling for the mobile's keys, only the key index or validity date is sufficient to transmit. This may also be used for maintenance, i.e. using the LDE communication form. However, there are other mechanisms to protect against fraudulent base stations, e.g. using strong encryption on the communication channel or specifically for the B-SAC teleservice.

When deactivation is requested the operator may just omit sending the next decryption key or if the status control technique is used immediately send and deactivation signal to put the status to disabled. If the user turns off the phone, in an attempt to avoid receiving the deactivation signal, the system may automatically send this message again when e.g. the device performs a registration (assuming a regular mobile i.e. a type A remote device).

For a type A2 remote device the service key etc. could be entered locally. This may be deemed valuable when testing or performing maintenance of the device. For example consider that the user has a complaint regarding the operation of his or her current device and is given a new device while the original device is sent for maintenance. The user still wants to continue receiving information broadcast by his or her subscribed services. The A-key (for regular authentication) can be entered through the key pad. The service decryption keys however should not be entered directly but rather a highly secure form of encryption or other special equipment should be used. Otherwise someone could publish the decryption key on the WEB and any user could enter the key himself. Secure means to access protected program areas in mobile phones are developed and in currently in use.

Other optional functions associated with B-SAC may also be implemented. The user may set the remote device to receive a subset of the services subscribed to, e.g. by using the key-pad. The user may, e.g. by entering a special mode, obtain information about remaining subscription time. This may be of special interest for pay-per-view type of subscription or pre-paid which now has become a popular method to acquire users with questionable credit. At activation, the user may have accepted a one time charge for a limited time of service access. The user may have subscribed to multiple time segments and hence have been downloaded several instances of keys for a particular service. The user may have provided a credit card number when the activation request was generated. For smart card applications, the pre-paid service credentials may be stored on the smart card. A set of keys with attributes, potentially for multiple time segments, may have been programmed into the card when the card was manufactured. In this case, the decryption key is provided on the card and may be sent to the device for decryption in the device or the data subject for decryption may first be sent to the card for decryption and then sent back to the device for presentation.

In summary, to accommodate type B devices, in particular type B2, the embodiment described above with respect to FIG. 5 is suitable where, on the broadcast channel itself, the signals in the form of status variables or keys are transmitted. An advantage of the status variable solution is that the device need not have any other parameter known to the system than the address. The user who requests a service may inform the operator about the address of the device (e.g. printed on the device). The B-key, however, can not be printed on the device. The service operator then establishes a relationship between an address and a B-key which the manufacture has entered into the device. The same procedure that has been established for transferring an A-key in present cellular phones, before OATS became available, between manufactures and operators can be used. For B2 devices the B-key can not be changed. If the link between address and B-key is ever lost, the device is made inoperable. For B1 type remote devices, a new relationship can be established between an address and a B-key by entering a new key.

Once the operator has decided whether it will support type A remote devices only, type B devices only or both type A and type B devices, a B-SAC methodology in accordance with the principles set forth herein can be developed. If an operator predicates B-SAC design on support of only type A remote devices, e.g., in the interest of maintaining the whereabouts of a remote device, then perhaps most B-SAC applications would include the use of an acknowledged delivery teleservice, e.g., OATS, to send either the status variable enable/disable message or the service key to the remote device. Such an exemplary (encryption) embodiment would have some or all of the following features. First, transmit the broadcast service information in an encrypted form. Second, encrypt the service key (used to decrypt the encrypted service information) using a standard form of encryption (e.g., A-key based). Third, use a mechanism that requires an acknowledgement from the remote device, e.g., OATS or a dedicated teleservice to deliver the encrypted service key. Fourth, use the standard MIN/IMSI as the address for the message including the encrypted service key.

Other variations of these concepts are also possible. For example, the service could also transmit an indicator as to whether it used a status variable B-SAC like that described above with respect to FIG. 5 or an encryption B-SAC like that described above with respect to FIGS. 6–7. Remote devices could quickly check the indicator to see if they are authorized to read the broadcast information on a particular sub-channel. If unauthorized, the remote device could output a standard message provided by the service provider, e.g., "dial *888 to obtain additional information to activate this service."

Commercials for the broadcast service on a sub-channel (or other types of commercials) could also be output, e.g., as a headline banner on the display of the remote device. For example, if the remote device is not authorized to read the broadcast information, e.g., if the status variable is disabled or it does not have the designated key, then commercials may be provided or, alternatively, commercials may be interspersed among the other broadcast information. For example, a description of the contents or a sub-set (sneak view) of the broadcast service which are charged for may be provided on the broadcast channel itself or as a point-to-point message. The descriptions and/or a sneak preview of the service is a form of commercial and provides a teaser to attract more customers.

Several exemplary implementations for this sneak preview embodiment will now be described. Note that more than one of these techniques may be used at the same time. First, a commercial preview may be provided on a broadcast channel without access control. Even if the subscription form of the service is controlled using an encryption or scrambling based B-SAC, the preview version is not encrypted. A separate identifier for the preview portion of the information broadcast on the associated channel or subchannel regarding B-SAC is provided, i.e. indicating the service and that no encryption is used for the preview portion. The value for the identifier for the preview may be different than for free services in general. Thus, the user and/or the mobile may recognize that this is a preview of otherwise charged-for broadcast information contents. Similar preview mechanisms can be provided which have access control using a status variable based B-SAC. An identifier can be set to a value indicating a free sub-set of the otherwise charged for service. A second instance of B-SAC control for the charged-for service is provided i.e. set to the status variable to enabled. As an example, the preview contents may include most hold stocks/funds, most active stocks/funds, etc., instead of the complete set available on the charged-for portion of the channel.

As a second variation, the entire broadcast service may be made not subject to B-SAC during a limited time. For example, once per month the entire service may be free of charge. If encryption or scrambling based B-SAC is used, the encryption is disabled. The value of the B-SAC control identifier may be different than for free service in general. Thus, the user and/or the mobile may recognize that this is a temporarily free service of what would otherwise be charged contents. A similar provision may be made for status variable based B-SAC. An identifier can be set to a value indicating a free service.

As a third variation, a message can be provided, e.g. using a broadcast channel or a point-to-point channel, indicating a description but without an actual sample of the broadcast information service. For example, for a security service it may state that the user will be provided with information regarding all stocks and mutual funds found in the USA Today or Wall Street Journal or any other scope that a user would understand. For a sports result channel, the scope listed can be what leagues' scores are provided e.g. NHL, NBA etc.

The user may enter a command and the remote device will display both the available broadcast services and an indication as to which of these services the user is eligible to receive (or, alternatively, the remote device may simply display only those services that the user is eligible to receive). A particular service may be available for a fee by one operator, but available free by another operator. The user may select a displayed service from the menu for more information. In this way, the remote device presents a description of the broadcast service to the users.

The information regarding the preview itself, temporarily free content, as well as a description of the preview content can be provided to the remote device or the user by, for example,:

(1) including a commercial in the billing statement e.g. that there is a preview channel, when the entire channel is free and where and how (e.g. what key-pad entries to use) to find the description channel, preview channel and the free channel;

(2) sending the information to the user using the wireless system e.g. an SMS message or a fax;

(3) indicating, e.g., on a service operator's website, a simulated (e.g., not current data) version of the broadcast channel's information or a replica of what is currently transmitted on the wireless channel (with a potential delay between the two transmission means given implementation and protocol constraints). The user would then see a simulated screen representing a lap-top or other device with the contents being updated to provide a realistic view regarding how the service would look if subscribed as an interface between the wireless service and the user's equipment.

An alternative to the provision of an identifier indicating a preview is to send the encryption key to all mobiles or the mobiles selected by the system or service operator to get the preview. The preview and the rest of the channel are encrypted with different keys. Drawbacks associated with this implementation include that: regular customers must have two service keys or that the preview contents must be repeated within the regular service, the sneak view customers must be given an encryption key, which increases the demand of distributing keys. This same technique ( and resulting drawbacks) apply to broadcast services employing the status variable based B-SAC mechanism and for the free (as opposed to the preview) channel.

A particular broadcast service may be delivered and/or sold with different attributes in order to tailor the service to various market interests. For example, a stock quote service may be delivered in real time or delayed. Since it takes some time to deliver a service over a wireless interface, a "real time" broadcast information service is denoted here as a Near Real Time (NRT) service. That is, at the service server the information is real time but due to delivery time, including channel errors, it may take some additional time to deliver the information to the end user and, therefore, can not be offered as a real time service. Alternatively, for a lower charge the user can subscribe to a delayed service. Two logical sub-channels (or sets of logical sub-channels) can be allocated for the dual purposes of NRT service and delayed service associated with the same broadcast information. Separate status variables or decryption keys are used for each. However, this parallel service transmission would increase the bandwidth requirement to be the sum of both the fast and the slow service. Another, more efficient, solution is to only transmit the NRT service.

If the B-SAC methodology implemented for these broadcast services is based on the status variable concept, each service level has its own service indicator (SI). One of the SIs allows the remote device to present the data as it arrives in the device without any restrictions, i.e., to provide NRT service. The second SI implies, by the design of the device, to delay the presentation of the broadcast information by a certain amount of time, i.e., to provide delayed service. Both SIs are sent on the BCCH. Alternatively, a common SI is used and an additional identifier, sent to the device when updating the SV, is used to indicate delayed presentation. The required delay can be sent along the service itself, e.g., on the BCCH. Alternatively, the delay can be entered by the manufacture or sent as a point-to-point message over the wireless link.

If the B-SAC methodology implemented is based on the encryption concept, both service levels read the same date and hence use a common key. At key delivery, an additional identifier is sent to the device informing whether the remote device shall impose a delay or not before presenting the data. An alternative solution, which more strongly protects the service from fraudulent usage, is to provide a secret variable alongside the service data. The variable changes periodically for the non-NRT subscribers in an unpredictable fashion. Thus, in addition to the basic encryption, the entire broadcast information service contents are scrambled or encrypted with this secret variable. This secret variable can be sent in the clear or sent under the protection of the basic encryption when the required delay has occurred. The non-NRT subscriber must wait until this variable is present on the channel until it can fully decrypt the service data. All previously received service data since the last presence of the variable is decoded using the variable and the basic decryption key. The variable may be sent repetitively around the time when the stipulated delay has occurred in order to be less sensitive to channel errors. The NRT subscribing remote devices will receive information sent along with the key delivery such that it can decode the data without any delay. For example, a non-linear shift register can be used which outputs the secret variable. The content of this shift register for a given time tic (where the tic is incremented with respect to the delay) is known to the device, which can thus calculate the current value of the secret variable and decode the service data as it arrives.

Having the delay not be hardcoded in the remote devices allows the operator to change the delay. More than two levels of delay can also be used since the delay may be device specific or multiple delays can be transmitted on the BCCH. The aspect of delayed delivery is applicable to any of the broadcast service information that may be time/cost variable, e.g., sports results.

The organization of the services may be such that the NRT provides only a summary of the information provided on the delayed service, e.g., market indexes, most heavily traded stocks, most commonly held stocks, etc. This summary may or may not be provided by the delayed service as well, i.e., the summary may be a subset of the delayed service. This organization may be of interest if the full scope of the service requires more than a feasible amount of bandwidth to transmit in NRT, i.e., since the faster information associated with a service is to be delivered, the shorter the cycle time and the higher the bandwidth requirement. If providing all of the broadcast information for a particular service in NRT mode is not feasible, organizing the services as a summary in NRT mode and a fuller version in delayed mode still provides a manner whereby the service provider can offer multiple levels of service. Thus, the user may subscribe just to the NRT summary service, just to the fuller delayed service or to both. Again, the appropriate number of keys or SI/SV are delivered to the subscribing remote devices.

In addition to delineating different levels of service, the remote devices may operate to read broadcast information services in a manner which is intended to reduce power consumption in those devices. Thus, a remote device may not always read the broadcast service information to which that remote device has access by virtue of having a valid key or having an enabled status variable. For example, the user may set his or her remote device to read a particular, subscribed service only once per hour or once every ten minutes. For broadcast services having different service levels or different parts (e.g., the different sub-channels of the security quote service described above), the reading periodicity of the remote device may be varied by service level or service part. Exemplary service parts also include stock indices or securities which are part of a particular portfolio. Moreover, reading may triggered by more intelligent mechanisms than simply predetermined time intervals. Using the summary NRT and fuller delayed service example described above, the user could set his or her remote device to read the summary NRT every cycle or periodically, e.g., every ten minutes. Then, if information associated with a particular security/index of interest was read on the summary NRT, the remote device could be set by the user read the fuller, delayed version of the service. Alternatively, instead of automatically reading the fuller delayed version of the service, recognition that a preset user triggering condition has occurred could result in the remote device outputting a query to the user regarding whether the fuller, delayed version of the service should be read. The user can request the remote device to read, e.g., one cycle of the desired information. This request can be limited as to a subset of a cycle based on, for example, a predetermined amount of reading time, an attempt to read a full cycle, but if bit errors occur limited to a predetermined amount of reading time, a minimum percentage of the information in a complete cycle, etc. When the information is available, the user is alerted or an icon is displayed on the remote device's screen.

Of course, simply because the remote device has acquired new information from a broadcast information service may not justify immediate presentation to the user. Accordingly, the remote device may have several information presentation options which are user-selectable. In one mode information may be automatically presented as acquired. In another mode, when new information is acquired, the device may provide an audible or visual indicator, e.g., an icon, which requires some further input from the user prior to outputting the newly acquired information.

As mentioned in the above incorporated U.S. patent application entitled "Channelization and Encoding Techniques for Information Services Transmitted Via Radiocommunication Systems", the information provided by the broadcast information services can be transmitted by the system using broadcast (i.e., point-to-multipoint) resources and/or non-broadcast (i.e., point-to-point including packet data) resources. For example, consider the scenario where a mobile has received, by way of downloading this information from a server accessible via the Internet, an association between a company name and a stock symbol (or just a number), i.e., the type of information found on the Security Name sub-channel in the exemplary embodiment of FIG. 3, via an addressed message. Then, the system may only broadcast the start value sub-channel and the delta sub-channel. Alternatively, the information found on the start value sub-channel may also be provided to remote devices using addressed messages.

Even all three of the sub-channels may be provided as addressed messages. For example, once a remote device has downloaded the information associated with he security name and start value sub-channels, it can then request via SMS the delta channel information, e.g., for specific stock symbols or numbers. Yet another alternative is to allow the user to define a portfolio with a service server. Then, a remote device initiated request may simply ask for information regarding the entire portfolio. Upon receiving this request, the service server could provide this information via a teleservice including the information associated with both the start value and delta channels or just the delta channel. Another possibility is that a predefined trigger could result in the downloading of this information.

While the present invention has been described with respect to a securities quote service, one skilled in the art will appreciate that the invention would equally apply to other such systems where information is broadcast to a user. Moreover, the LDE described herein can be a cable, an infrared device, a keypad, or a wireless short range communication link. The LDE can communicate with a PC (the user may have gotten the decryption key as an e-mail, and an application program communicates with the device) or a special programming unit owned and operated by the operator or a dealer. Many variants and combinations of the techniques taught above may be devised by a person skilled in the art without departing from the spirit or scope of the invention as described by the following claims.

What is claimed is:

1. A method for controlling access to a broadcast information service in a radiocommunication system comprising the steps of:

encrypting information associated with said broadcast information service;

broadcasting said encrypted information over an air interface, wherein said encrypted information is available to a plurality of remote stations;

encrypting a service key for transmission using encryption derived from an A-key, wherein the A-key is derived by a receiving station according to information received wirelessly;

transmitting the service key usable to decrypt said encrypted information as part of message addressed to one or more subscribing ones of said plurality of remote stations; and periodically changing said service key.

2. The method of claim 1, further comprising the step of:
acknowledging, by said one or more subscribing ones of said plurality of remote stations, reception of said service key.

3. The method of claim 2, wherein said step of transmitting said service key further comprises the step of:
using Over-the-air Activation TeleService to deliver said service key.

4. The method of claim 3, wherein said step of transmitting said current service key further includes transmitting said current service key as a special purpose message.

5. The method of claim 1, wherein said step of transmitting said service key further comprises the step of: transmitting said service key on a broadcast channel.

6. The method of claim 1, wherein said step of transmitting said service key further comprises the step of:
transmitting said service key on a point-to-point channel.

7. The method of claim 1, further comprising the step of:
transmitting a subsequent service key to said subscribing ones of said plurality of remote stations in advance of using said subsequent service key to encrypt said information.

8. The method of claim 7, further comprising the steps of:
storing, at said subscribing ones of said plurality of remote stations, said subsequent service key and said service key; and
using said subsequent service key to decrypt said information at a time broadcast by said system.

9. The method of claim 7, wherein said step of transmitting said subsequent service key further comprises the step of:
transmitting, with said subsequent service key, a validity time period during which said subsequent service key is usable to decrypt said information.

10. The method of claim 7, wherein said step of transmitting said subsequent service key further comprises the step of:
transmitting, with said subsequent service key, a key index usable by a remote station to determine whether said subsequent service key is valid.

11. The method of claim 7, further comprising the step of storing said service key and said subsequent service key in a memory device in one or more of said plurality of remote stations.

12. The method of claim 11, wherein said memory device includes a removable smart card.

13. The method of claim 1, wherein said step of encrypting information further comprises the step of:
scrambling said information using a predetermined variable.

14. The method of claim 1, wherein said step of transmitting said service key further comprises the step of:
transmitting, with said service key, a validity time during which said service key is usable to decrypt said information.

15. The method of claim 14, further comprising the step of storing said service key and said validity time in a memory device in one or more of said plurality of remote stations.

16. The method of claim 15, wherein said memory device includes a removable smart card.

17. The method of claim 1, wherein said step of transmitting said service key further comprises the step of:
transmitting, with said service key, a key index usable by said one or more subscribing ones of said plurality of remote stations to determine whether said service key is valid.

18. The method of claim 17, further comprising the step of storing said service key and said key index in a memory device in one or more of said plurality of remote stations.

19. The method of claim 18, wherein said memory device includes a removable smart card.

20. The method of claim 1, wherein said service key is further selected from one of a personal identification number (PIN) and a service identification number (SIN).

21. The method of claim 1, wherein said step of transmitting said service key further comprises the step of:
transmitting said subsequent service key multiple times.

22. The method of claim 1, wherein said subscribing remote stations incur a fee for gaining access to said encrypted information.

23. The method of claim 22, wherein said fee is deducted from one of a bank account and a pre-paid account.

24. The method of claim 22, wherein said fee is charged to a credit card account.

25. The method of claim 1, wherein one or more of said plurality of remote stations is further equipped with a memory device and wherein said method further comprises the step of storing said service key in said memory device.

26. The method of claim 25, further comprising storing a prepaid amount in said memory device; wherein said prepaid amount represents a subscription fee for said broadcast information.

27. The method of claim 26, wherein said memory device includes a removable smart card.

28. A method for controlling access to a broadcast information service in a radiocommunication system comprising the steps of:
broadcasting information associated with said broadcast information service over an air interface, wherein said information is available to a plurality of remote stations;
transmitting an enable signal to a subscribing one or more of said plurality of remote stations; and
outputting, at said subscribing one or more of said plurality of remote stations, said information if said subscribing one or more of said plurality of remote stations has received said enable signal.

29. The method of claim 28, further comprising the step of:
acknowledging, by said subscribing one or more of said plurality of remote stations, reception of said enable signal.

30. The method of claim 28, wherein said step of transmitting said enable signal further comprises the step of:
transmitting said enable signal in a message addressed to said subscribing one or more of said plurality of remote stations.

31. The method of claim 28, wherein said step of transmitting said enable signal further comprises the step of:
transmitting said enable signal on a point-to-point channel.

32. The method of claim 28, wherein said step of transmitting said enable signal further comprising the steps of:
transmitting said enable signal at periodic intervals.

33. A mobile station comprising:
a receiver for receiving broadcast information associated with a broadcast information service on at least one broadcast resource and for receiving enable and disable messages associated with said broadcast information service;
a memory device for storing an enabled/disabled status variable which has a value based upon said enable and disable messages; and an output device for outputting said broadcast information only when said enabled/disabled status variable has an enabled value.

34. The mobile station of claim 33, wherein said enable/disable status variable includes an expiration time value; wherein said memory device further stores a receipt date for which a last enable message was received; and wherein said mobile station maintains a current time value.

35. The mobile station of claim 34, wherein said enable/disable status variable is set to a disabled value if said stored receipt date plus said time expiration time value is less than said current time value.

36. The mobile station of claim 35, wherein said expiration time value is set to said receipt date of said enable message.

37. The mobile station of claim 36, wherein said current time value is set to a value provided over a BCCH.

38. The mobile station of claim 36, wherein said expiration time value is no greater than a predetermined maximum time value.

39. The mobile station of claim 36, wherein said expiration time value is updated to a predetermined value received in said disable message.

40. A mobile station comprising:
   a receiver for receiving encrypted broadcast information associated with a broadcast information service on at least one broadcast resource and for receiving a current service key usable to decrypt said encrypted information;
   an encryption derivation device for deriving the encryption of the current service key according to information received wirelessly by the receiver;
   a memory device for storing said current service key; and
   an output device for outputting said broadcast information upon decryption of said encrypted information by said current service key.

41. The mobile system of claim 40, wherein said current service key is encrypted prior to transmission from said broadcast information service.

42. The mobile system of claim 41, wherein said current service key encryption is derived from an A-key received by the receiver wirelessly.

43. The mobile system of claim 41, wherein said current service key is encrypted according to a B-key.

44. The mobile system of claim 43, wherein said B-key is an ESN corresponding to said mobile station.

45. The mobile system of claim 41, further comprising a table for storing said plurality of service keys.

46. The mobile system of claim 40, wherein said current service key is valid for a predetermined time period.

47. The mobile system of claim 46, wherein said receiver receives a subsequent service key prior to expiration of said predetermined time period.

48. The mobile system of claim 47, wherein said receiver is configured to update from said current service key to said subsequent service key based on information received on a BCCH.

49. The mobile system of claim 46, wherein said receiver is alerted if said current service key is invalid.

50. The mobile system of claim 40, wherein said memory device further stores a plurality of service keys.

51. The mobile station of claim 40, wherein said memory device includes a removable smart card.

52. The mobile station of claim 51, wherein said removable smart card is further configured to store a prepaid amount, wherein said prepaid amount includes a subscription fee for said broadcast information service.

53. The radiocommunication system of claim 51, wherein said memory device includes a removable smart card.

54. A radiocommunication system for providing broadcast information services to subscribers of said services, the system comprising:
   encryption means for encrypting said broadcast information;
   transmission means for transmitting said encrypted broadcast information and for transmitting a key usable for decrypting said encrypted broadcast information; and
   at least one remote reception means for receiving said encrypted broadcast information and for receiving said transmitted key wherein said at least one remote reception means further comprises:
      a derivation means for deriving the encryption of the key according to information received wirelessly by the remote reception means;
      a processor means for using said key to decrypt said encrypted information; and
      output means for outputting said decrypted information.

55. The radiocommunication system of claim 54, wherein said information is output by the output means a predetermined time after it has been received.

56. The radiocommunication system of claim 55, wherein said broadcast information includes service data associated with one or more broadcast services.

57. The radiocommunication system of claim 56, wherein said service data is output repeatedly by said output means according to a predetermined interval.

58. The radiocommunication system of claim 57, wherein said broadcast information includes a secret variable associated with said service data for determining a mode of delivery of said service data.

59. The radiocommunication system of claim 58, wherein said service data includes Near Real Time (NRT) data and wherein said secret variable enables said mode of delivery of said NRT data to be received without delay.

60. The radiocommunication system of claim 55, wherein said predetermined time is transmitted to said reception means.

61. The radiocommunication system of claim 58, wherein said mode of delivery of said service data includes an abbreviated mode of said service data.

62. The radiocommunication system of claim 61, wherein said mode of delivery of said service data includes a full mode of said service data.

63. The radiocommunication system of claim 62, wherein said mode of delivery of said service data includes an alert indicating that said service data is available.

64. The radiocommunication system of claim 63, wherein said alert includes an audible alert indicating that said service data is available.

65. The radiocommunication system of claim 64, wherein said alert includes a visual alert indicating that said service data is available.

66. The radiocommunication system of claim 65, wherein said mode of delivery of said service data includes a prompt mod e, wherein predetermined information must be provided to said remote station before said service data is output.

67. The radiocommunication system of claim 54, wherein said information includes financial market activity.

68. The radiocommunication system of claim 54, wherein said information includes sports scores.

69. The radiocommunication system of claim 54, wherein said information includes news headlines.

70. The radiocommunication system of claim 54, further comprising a current service key indicating one or more broadcast information services including which of said one or more broadcast information services said at least one reception means is eligible to receive.

71. The radiocommunication system of claim 70, wherein said transmission means is configured to request verification that said at least one reception means is eligible to receive said one or more broadcast services.

72. The radiocommunication system of claim 71, wherein said reception means is configured to respond to said request for verification by providing a validity date.

73. The radiocommunication system of claim 71, wherein said reception means is configured to respond to said request for verification by providing a key index.

74. The radiocommunication system of claim 54, wherein said key further includes a validity time period during which said key is valid.

75. The radiocommunication system of claim 74, wherein said key further includes a key index to validate said key.

76. The radiocommunication system of claim 75, wherein said key is provided over a BCCH.

77. The radiocommunication system of claim 76, wherein an alert is provided if said key is invalid.

78. The radiocommunication system of claim 54, wherein said at least one remote reception means further includes a memory device for storing said key.

79. A method for providing access to a broadcast information service in a radiocommunication system comprising the steps of:

encrypting portions of information associated with said broadcast information service;

broadcasting said information associated with said broadcast information service over an air interface, wherein said information is available to a plurality of remote stations;

encrypting a service key for transmission using encryption derived from an A-key, wherein the A-key is derived by a receiving station according to information received wirelessly;

transmitting the current service key usable to decrypt said encrypted portions of said information as part of message addressed to selective ones of said plurality of remote stations; and periodically changing said current service key.

80. The method of claim 79, wherein said key is transmitted to subscribing ones of said remote stations.

81. The method of claim 79, wherein said broadcast information includes commercial messages for said broadcast information service, said commercial messages being transmitted without encryption.

82. The method of claim 81, wherein said commercial messages include a description of one or more broadcast information services.

83. The method of claim 79, further comprising the step of periodically removing said encryption from said portions of said information.

84. The method of claim 79, wherein one or more of said plurality of remote stations further includes a memory device, and wherein said method further comprises the step of storing said current service key in said memory device.

85. The method of claim 84, wherein said memory device includes a removable smart card.

86. The mobile station of claim 33, further comprising a second memory device for storing information including a prepaid amount.

87. The mobile station of claim 86, wherein said prepaid amount represents a subscription fee for said broadcast information.

88. The mobile station of claim 87, wherein said second memory device includes a removable smart card.

* * * * *